May 19, 1970 E. A. BENESCH 3,512,712
AUTOMATIC WATERING DEVICE
Filed Oct. 13, 1967 2 Sheets-Sheet 1

Edward A. Benesch
INVENTOR.

BY Clarence A. O'Brien
and Harvey B. Jackson
Attorneys

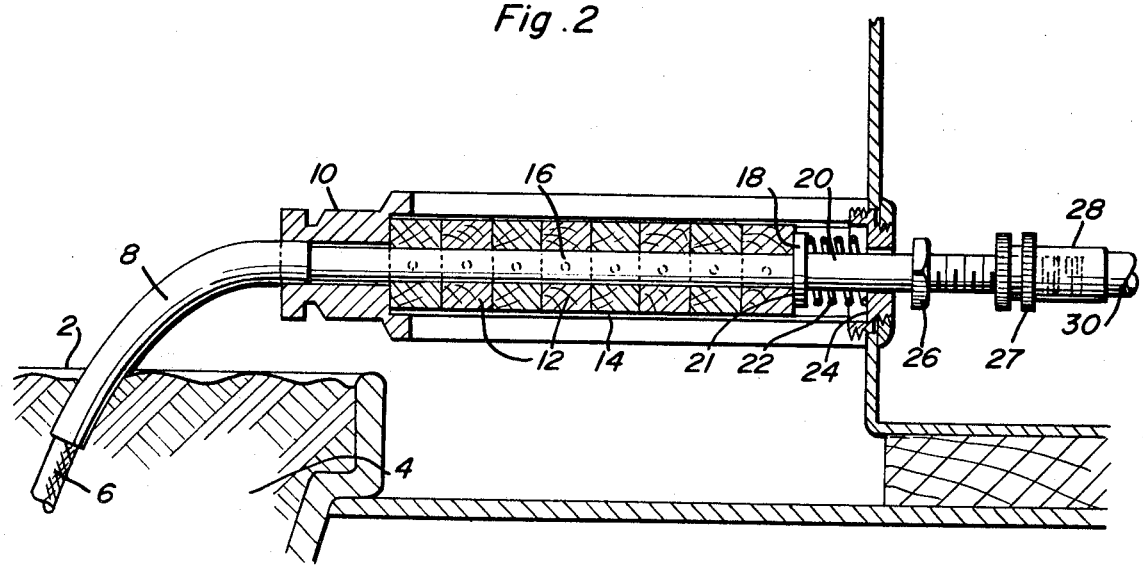
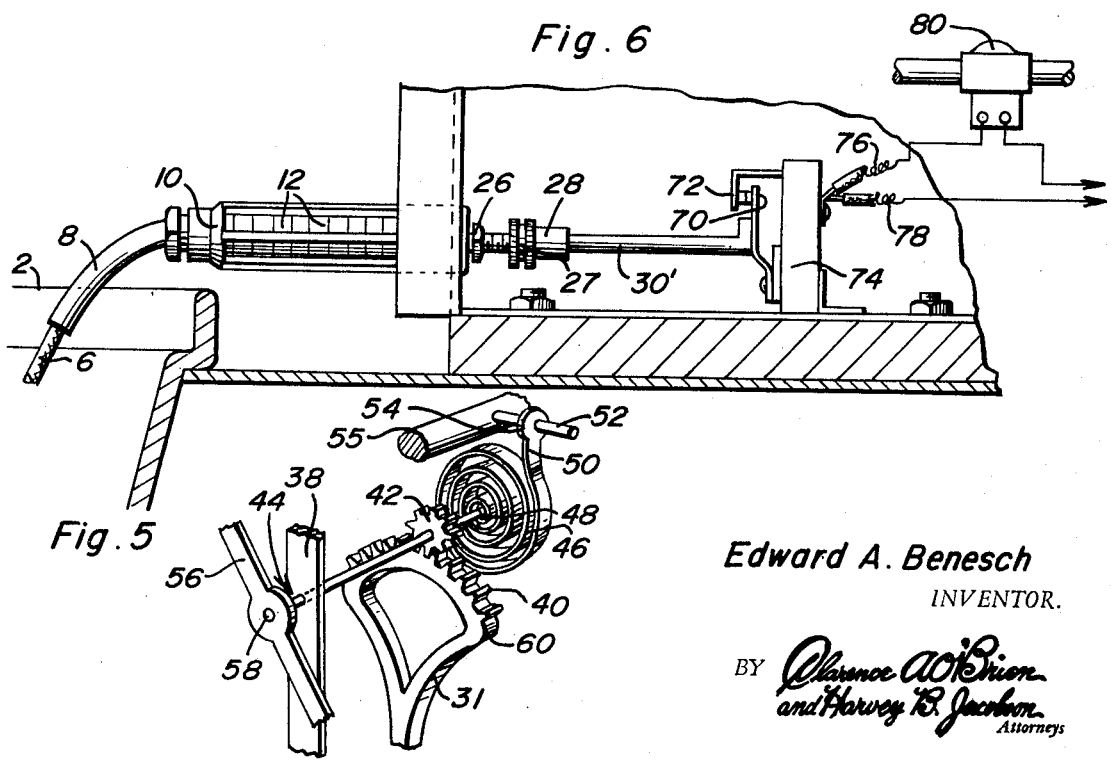

United States Patent Office 3,512,712
Patented May 19, 1970

3,512,712
AUTOMATIC WATERING DEVICE
Edward A. Benesch, Box 58, Rte. 2, Laurel Brook Road, Fallston, Md. 21047
Filed Oct. 13, 1967, Ser. No. 675,168
Int. Cl. A01g 27/00
U.S. Cl. 239—63                      6 Claims

ABSTRACT OF THE DISCLOSURE

A moisture controlled water valve including a series of wooden blocks adjacently positioned and exposed to soil and atmospheric moisture whereupon the blocks expand and contract in accordance with the variation in moisture to which the blocks are exposed. The blocks are summarily linked to either a linkage member which executes displacement in accordance with the expansion and contraction of the blocks or an electric switch operative in the same manner. The linkage member operates to control a water valve inserted in an irrigating water supply. A linkage displacement gauge mechanism is geared to the linkage member for providing a visual indication of the wooden blocks. The electric switch arrangement controls a water supply valve in a similar manner to the linkage member.

---

The field of this invention is that of irrigation systems, and the invention relates more particularly to irrigation systems which are adapted to operate automatically without supervision.

In order to furnish adequate irrigation, an automatic irrigation system must be adapted to add the required amount of water to the soil in order to maintain optimum moisture conditions in the soil for encouraging the growth of vegetation. Further, the system must be capable of regulation so that irrigation will be effected only during periods when soil moisture is below an optimum level. Soil moisture level is determined by principal environmental factors such as solar radiation, relative humidity and air movement, that determine the evaporation power of the air and water absorption by vegetation.

In the past, various proposed automatic irrigation systems have provided irrigation at intervals without regard to the amount of rainfall or prevailing humidity in a particular period or have included expensive and unreliable means such as ground moisture detecting electronic apparatus which are unable to detect small variations in soil moisture. Prior automatic constructions have failed to provide a visual indication of soil moisture conditions for purposes of informing the vegetation grower of such conditions as well as providing a facility for monitoring machine operation. Certain previous devices have employed expensive electronic construction which eventually fails due to unreliability which becomes apparent after aging of electronic components.

To briefly summarize the present invention, a wick is inserted into soil and moisture therefrom is conveyed by capillary action to a set of adjacently positioned wooden blocks which expand and contract in accordance with two important factors, namely, (1) variation of soil moisture and (2) variation in humidity conditions of the ambient atmosphere. In one embodiment of the invention, the dimensional variation of the wooden blocks is made to drive a linkage train which terminates in a head extension, the latter capable of actuating a water valve during periods of soil dryness. The aforementioned linkage train is coupled to a pivotal arm which exhibits rotational motion in accordance with the displacement of the linkage. The pivotal arm actuates a dial demonstrating the degree of linkage displacement which is dependent upon the condition of the soil. In another embodiment, the dimensional variation in the wooden blocks actuates an electric switch to control a water valve.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a fragmentary longitudinal sectional view, on an enlarged scale, of the wooden blocks contained within an apertured cylinder into which is inserted an end of a wick for conditioning the blocks, the opposite end of the wick being inserted into soil.

FIG. 5 is an exploded fragmentary perspective view of the driving mechanism for the gauge actuating arm.

FIG. 6 is a fragmentary sectional view of the automatic watering device employing an electrically actuated water valve.

Figure 1:
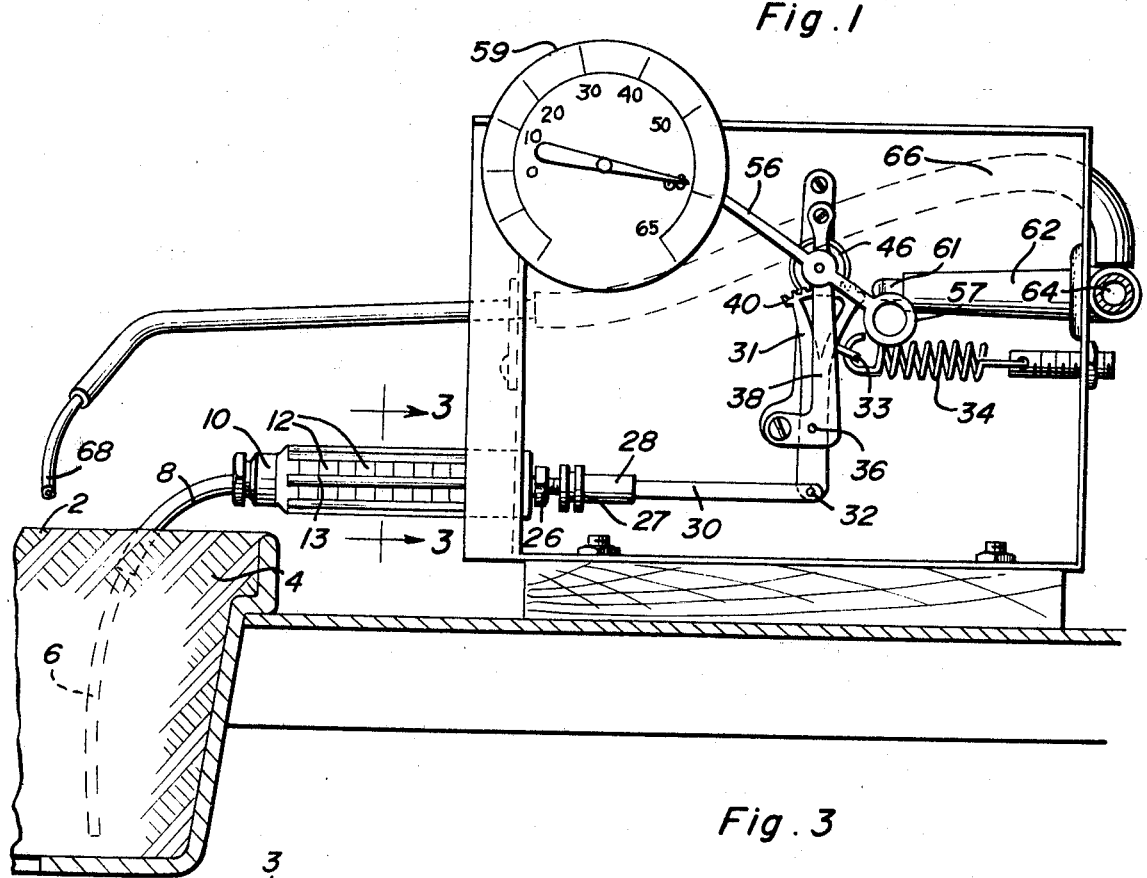
FIG. 1 is a front sectional view illustrating the components of the automatic watering device.
Figure 3:
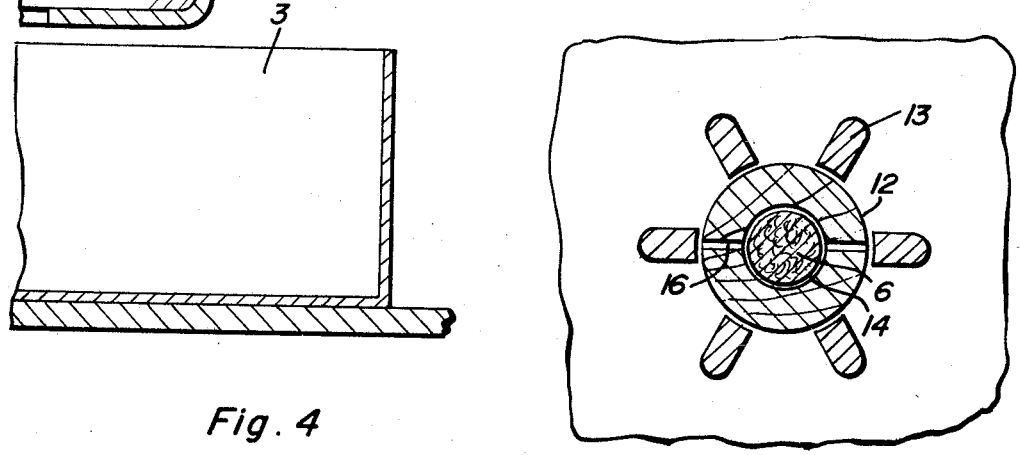
FIG. 3 is a transverse sectional view, on an enlarged scale, taken substantially along vertical plane 3—3 of FIG. 1.

Refering to the drawings, soil container 2, which may be a conventional clay pot, is disposed above water receptacle 3 the latter employed for receiving water drippage container 2. Within container 2 is deposited soil 4 into which is inserted wick 6 for conducting soil moisture along its length by capillary action. Disposed about an intermediate segment of wick 6 is a waterproof sleeve 8 of plastic or the like protecting the externally exposed portion of wick 6 the length of which is continued into aperture cylindrical housing 10 in which are disposed cylindrical wooden blocks 12 held in concentric position with the axis of cylinder 10 by virtue of the inwardly radial structural support rendered by circumferentially spaced, longitudinal rods 13, the latter made from metal, plastic or other suitable non-absorptive material. The exterior portions of the wooden blocks 12 not contacted by the rods 13 are exposed to the ambient atmosphere.

Figure 4:
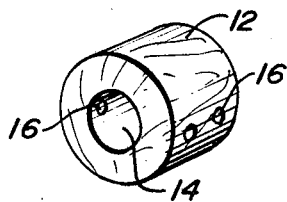
FIG. 4 is a view in perspective of a wooden block.

Reference to FIG. 4 of the drawings clearly illustrates the structure of each wooden block 12 which contains an axial bore 14 extending the length of each block through which wick 6 extends. Air vent holes 16 are formed within the wall of each cylindrical block and perpendicular thereto. The vent holes 16 are provided to equalize pressure conditions within the block bore to more evenly distribute the moisture contained within wick 6 along the length of the bore 14.

As shown in FIG. 2 of the drawings, one end of shaft 20 includes a disc head portion 18 disposed within cylindrical housing 10, the outward surface of the head portion 18 abuts end block surface 21. Coil spring 22 disposed concentrically about shaft 20 exerts a bias against head portion 18 thereby insuring contact between the head and end block surface 21. The spring 22 is retained within the housing of cylinder 10 by virtue of a screw-threaded plug having a restraining surface 24 located on the internal end wall of cylinder 10 opposite the cylinder end into which wick 6 enters. Hexagonal head 26 disposed exteriorly of the housing is concentrically mounted on a threaded portion of shaft 30 and permits rotational adjustment of the shaft by wrench means. Coupling 28 provides a means of attaching shaft 20 to linkage member 30. The coupling includes a threaded bore for permitting an adjustment in the length of shaft engagement within the coupling. A locknut 27 bearing against the coupling locks the shaft 20 in a preselected position. It will be apparent that adjustment of shaft 20 within coupling 28 permits an adjustable linkage arm between the wooden blocks and linkage member 30.

Inspection of FIG. 1 shows linkage member 30 connected to linkage member 31 at the point of pivotal connection 32. Spring connector 33 attached to linkage member 31 allows attachment thereto of coil spring 34 which provides a fixed bias upon linkage member 31, for purposes hereinafter made apparent. The pivotal pin 36, connected along an intermediate length of linkage member 31 permits rotational motion of linkage member 31 with respect to stationarily fixed bracket 38.

In FIG. 5 it will be seen that linkage member 31 contains a geared segment 40 which engages and rotatingly drives gear 42 which in turn is fixedly mounted to shaft 44. Concentrically disposed around shaft 44 is spiral spring 46 which functions to maintain torsion on shaft 44 thereby eliminating slack between gears 31 and 42. One end 48 of the spring is fixedly attached to shaft 44, the opposite end 50 of the spring 46 terminates in an eyelet affixed to pin 52 which in turn is anchored within pin keeper 54, the latter formed within a stationary post 55. One end of an arm 56 terminates in a balance portion 57. Arm 56 includes a socket portion 58 along an intermediate length thereof. The socket portion is press fitted onto the outward end of shaft. This latter shaft is rotationally mounted within stationary bracket 38. The gauge actuating arm 56 is terminally connected at a second end thereof to displacement gauge 59 which may be a gauge of the common diaphragm actuated pressure type, modified so that the diaphragm sensor is removed, the dial mechanism being actuated instead by gauge actuating arm 56. During a preselected dry soil condition, contacting surface 60 of linkage member 31 bears against depressor 61 of water valve 62 causing inlet water flow 64 to conduct through the valve. This occurs when linkage member 31 is rotated clockwise an angular displacement sufficient to actuate depressor 61. After such actuation, water flow is permitted through valve 62 into water outlet 66 which conducts water flow to outlet orifice 68 positioned above soil container 2.

In operation of the invention, wick 6 conducts moisture to wooden blocks 12 which expand thereby causing linkage 30 to move in the right direction thereby causing linkage 31 to rotate counter-clockwise to a position where no force is exerted upon depressor 61 of water valve 62. Bias spring 34 is employed to return surface 60 to a position abutting depressor 61. Accordingly, the valve prevents water flow therethrough. In order to provide a visual indication of the state of angular position maintained by linkage member 31, gear 42 is meshed with the tooth portion 40 of linkage member 31, as may be observed in FIGURE 5. Gear 42 is fixed to shaft 44 thereby causing rotation of this shaft when linkage member 31 is angularly displaced. The rotation of shaft 44 causes a similar rotation gauge actuating arm 56 which in turn translates the aforementioned rotational motion to a sensing mechanism within the gauge 59 finally resulting in a visual indication of displacement initiated by expansion and contraction of wooden blocks 12 thereby causing the blocks to contract which effects a linkage displacement and subsequent mechanism operation opposite to that previously described for the moist condition. Referring to FIGS. 1 and 5 it should be apparent that under dry conditions, contacting surface 60 of linkage member 31 is displaced inwardly of the valve 62 which actuates the valve thereby permitting water flow from inlet 64 to outlet conduit 66, the latter conducting water flow through outlet orifice 68, into the soil container 2 thereby accomplishing a controlled irrigation process. It will be appreciated that the point of contact between surface 60 of the gear 31 and depressor 61 is governed by the adjustment in the linkage length between the wooden blocks and the linkage member 30. This adjustment depends upon the extent of the engagement between shaft 20 and coupling 28.

In FIG. 6 of the drawings, an alternate embodiment of the present invention may be seen. Linkage displacement control is accomplished in the same manner as presented by the previously preferred embodiment. However, in the alternate construction, linkage member 30 controls electrical contacts 70 and 72 of electrical switch 74 to which are connected electrical conductors 76 and 78. Depending upon the moisture condition of soil 4, the electrical contacts 70 and 72 will be opened or closed as a result of the displacement of linkage member 30 and thereby control the flow of electric current through conductors 76 and 78 which in turn effectuate the operation of water valve 80. A fixed differential is maintained by the switch thereby establishing a point of actuation.

In actual construction of the present invention and as FIG. 1 illustrates, the wooden blocks 12 are retained in cylindrical alignment by rods 13 which are spaced around the external surface of the blocks and maintained longitudinally parallel to the axis of the cylinder formed by the blocks. Those portions of the blocks not contacted by the rods remain exposed to the ambient atmosphere. As a result, the wooden blocks become subject to the effect of humidity in the atmosphere as well as the moisture contained within the wick 6 threaded through the interior of each block. Accordingly, the quantity of irrigation water and the frequency of its deposition are dependent upon the relative humidity of the atmosphere as well as the moisture of the soil.

Although the instant disclosure pertains to the irrigation of a clay pot, it is obvious that the present invention is well adapted for control of irrigation of hot house complexes and ground vegetation.

What is claimed as new is as follows:

1. A water valve control device comprising means for conducting moisture from soil along a predetermined path, means for absorbing said conducted moisture, said last means exposed to ambient atmosphere and exhibiting dimensional variations due to expansion and contraction in accordance with the level of moisture within said absorbing means, means connective with said absorbing means for translating said dimensional variations, means for controlling water flow through a conduit and means linking said connective means and said water controlling means whereby said linking means actuates said water controlling means when said linking means maintains a first position and conversely deactuates said water controlling means when maintained in a second position, said means for conducting moisture from said soil being a wick and further wherein said absorbing means is comprised of a plurality of adjacently positioned wooden blocks, a portion of the outer surface of said wooden blocks exposed to ambient atmosphere, each of said blocks containing a longitudinally disposed axial bore extending the entire length thereof, said bore accommodating an associated segment of said wick, each of said blocks further characterized by vent holes formed transversely therethrough, said vent holes exposed to ambient atmosphere.

2. An apparatus as recited in claim 1 wherein said wick enters a first end of said plurality of wooden blocks and terminates at the opposite end thereof, said connecting means including a disk head abutting said opposite end of the blocks, and a first shaft concentrically affixed to said head, a coil spring biasing said head in a manner causing said head to exert a compressive force against said plurality of wooden blocks.

3. A device as claimed in claim 2 wherein said linking means includes a linkage member, a portion of same characterized by a first geared segment, a second gear mounted upon a second shaft and oriented to mesh with said first geared segment, a spiral spring disposed concentrically about said second shaft, means linking one end of said spiral spring with said second shaft, the second end of said spiral spring stationarily fixed, said spiral spring maintaining torsion of said second shaft thereby reducing slack between said meshing gears, a pivotal arm affixed to the outward end of said second shaft thereby translating rotational motion to said arm in proportion to and in the same sense as said second gear, and means for sensing and visually indicating the rotational motion of said arm.

4. A construction as defined in claim 2 wherein said linking means actuating said water controlling means comprises, switch means actuated by said connective means, and electrical conductors connecting said switch means and said water controlling means, said last means responsive to the presence of electrical current in said electrical conductors for permitting water flow through said conduit.

5. A water valve control device comprising means for conducting moisture from soil along a predetermined path, absorbing means having an inner channel for receiving the moisture conducting means, the absorbing means further being peripherally exposed to the ambient atmosphere and exhibiting dimensional variation in simultaneous response to moisture in the absorbing means as well as to ambient atmospheric conditions, means connective with said absorbing means for translating said dimensional variations, means for controlling water flow through a conduit and means linking said connective means and said water controlling means whereby said linking means actuates said water controlling means when said linking means maintains a first position and conversely deactuates said water controlling means when maintained in a second position.

6. The device set forth in claim 5 wherein the conduit includes a delivery end disposed above the soil for watering the soil from above the surface thereof.

References Cited
UNITED STATES PATENTS

| | | | |
|---|---|---|---|
| 1,675,302 | 6/1928 | Roemer | 73—337 X |
| 2,760,023 | 8/1956 | Kettering et al. | 200—61.06 |
| 3,204,872 | 9/1965 | Whear | 73—337 X |
| 3,261,125 | 7/1966 | Arkebauer | 47—38.1 |

ALAN COHAN, Primary Examiner

R. GERARD, Assistant Examiner

U.S. Cl. X.R.
47—38; 73—337; 137—78; 200—61.06